United States Patent
Roberts et al.

(10) Patent No.: US 11,396,309 B2
(45) Date of Patent: Jul. 26, 2022

(54) MANAGEMENT OF VEHICLE SENSORS AND RESPONSES TO SENSOR DATA

(71) Applicant: Toyota Connected North America, Inc., Plano, TX (US)

(72) Inventors: Simon P. Roberts, Frisco, TX (US); Daniel W. Reaser, Oak Point, TX (US); Gaurav Saxena, Plano, TX (US); Lance D. Jacobs, Plano, TX (US)

(73) Assignee: Toyota Connected North America, Inc., Plano, TX (US)

( * ) Notice: Subject to any disclaimer, the term of this patent is extended or adjusted under 35 U.S.C. 154(b) by 141 days.

(21) Appl. No.: 16/839,169

(22) Filed: Apr. 3, 2020

(65) Prior Publication Data

US 2021/0309257 A1 Oct. 7, 2021

(51) Int. Cl.
*B60W 60/00* (2020.01)
*B60N 2/00* (2006.01)

(52) U.S. Cl.
CPC ......... *B60W 60/0016* (2020.02); *B60N 2/002* (2013.01); *B60W 2420/52* (2013.01)

(58) Field of Classification Search
CPC combination set(s) only.
See application file for complete search history.

(56) References Cited

U.S. PATENT DOCUMENTS 10,303,961 B1   5/2019   Stoffel et al.
10,404,261 B1   9/2019   Josefsberg et al.
(Continued)

FOREIGN PATENT DOCUMENTS

DE   102018129097 A1   5/2019
EP   3358541 A1 *   8/2018   ........... G06F 16/285
JP   3738673 B2 *   1/2006

OTHER PUBLICATIONS

Galdia et al., "Localization of Passengers Inside Intelligent Vehicles by the Use of Ultra Wideband Radars" Signal Processing, Image Processing and Pattern Recognition. SIP 2011. Communications in Computer and Information Science, vol. 260. Springer (2011).
(Continued)

*Primary Examiner* — James J Lee
*Assistant Examiner* — Sophia Antonia Skipper
(74) *Attorney, Agent, or Firm* — Christopher G. Darrow; Darrow Mustafa PC

(57) ABSTRACT

A system for controlling vehicle sensors includes one or more processors and a memory coupled to the one or more processors and storing a sensor control module including instructions that control processor(s) to, if the vehicle is not moving, and responsive to occurrence of an event, control operation of at least one radar sensor to scan the vehicle occupant compartment at a first scanning rate. Responsive to an occurrence of another event following commencement of scanning at the first scanning rate, the processor(s) control operation of the at least one radar sensor to scan the occupant compartment at a second scanning rate different from the first scanning rate. After passage of a predetermined time period after commencement of scanning at the second scanning rate, it is determined whether a living object resides in the occupant compartment. If no living object resides in the occupant compartment, radar scanning of the occupant compartment is discontinued.

19 Claims, 6 Drawing Sheets

(56) References Cited

U.S. PATENT DOCUMENTS

| | | | |
|---|---|---|---|
| 11,017,248 B1* | 5/2021 | Toth | H04N 5/58 |
| 2008/0142713 A1 | 6/2008 | Breed et al. | |
| 2011/0109450 A1* | 5/2011 | Hirschfeld | B60N 2/002 |
| | | | 340/457 |
| 2014/0070943 A1 | 3/2014 | Breed | |
| 2015/0127224 A1 | 5/2015 | Tabe | |
| 2016/0358475 A1* | 12/2016 | Prokhorov | G05D 1/0022 |
| 2017/0088044 A1 | 3/2017 | Hensley et al. | |
| 2017/0182939 A1* | 6/2017 | Phatak | G08B 21/22 |
| 2018/0126950 A1* | 5/2018 | Aiderman | B60R 25/24 |
| 2018/0322348 A1* | 11/2018 | Sweet, III | G01S 15/93 |
| 2019/0039546 A1* | 2/2019 | Elangovan | G07C 9/0069 |
| 2019/0215672 A1* | 7/2019 | Orris | B60N 2/28 |
| 2020/0292686 A1* | 9/2020 | Murata | B60N 2/002 |
| 2021/0107421 A1* | 4/2021 | Uno | B60R 11/04 |
| 2021/0253063 A1* | 8/2021 | Pupillo | B60H 1/00742 |
| 2021/0293948 A1* | 9/2021 | Peng | G01S 13/345 |

OTHER PUBLICATIONS

Alizadeh et al., "Low-cost low-power in-vehicle occupant detection with mm-wave FMCW radar", found at arXiv:1908.04417v1 [eess. SP] Aug. 12, 2019.

\* cited by examiner

MANAGEMENT OF VEHICLE SENSORS AND RESPONSES TO SENSOR DATA

TECHNICAL FIELD

The subject matter described herein relates to autonomous control of vehicle sensors and vehicle operations responsive to sensor data. More particularly, the subject matter described herein relates to control of vehicle sensor operations to minimize power usage, and control of vehicle operations responsive to detection, by the vehicle sensors, that a living object has been left behind in a non-moving vehicle, or a vehicle occupant is out of position in a moving vehicle.

BACKGROUND

The sensors incorporated into a vehicle may consume significant amounts of power during their operation. An ongoing problem is power management of the sensors, especially in situations where it is necessary to operate the vehicle sensors with the vehicle engine shut off. In addition, for purposes of energy savings, it is generally desirable to operate the vehicle sensors so as to consume as little power as possible even when the vehicle engine is on.

SUMMARY

In one aspect of the embodiments described herein, a system for controlling one or more vehicle sensors for monitoring an occupant compartment of a vehicle is provided. The system includes one or more processors and a memory communicably coupled to the one or more processors and storing a sensor control module including computer-readable instructions that when executed by the one or more processors cause the one or more processors to, if the vehicle is currently not moving, and responsive to detection of a predetermined event of a first plurality of predetermined events, control operation of at least one radar sensor to commence scanning of the occupant compartment of the vehicle at a first scanning rate. The sensor control module also includes instructions to, responsive to an occurrence of a predetermined event of a second plurality of predetermined events following commencement of scanning at the first scanning rate, control operation of the at least one radar sensor to commence scanning of the occupant compartment of the vehicle at a second scanning rate different from the first scanning rate. The sensor control module also includes instructions to, responsive to a passage of a predetermined time period after commencement of scanning at the second scanning rate, determine if a living object resides in the occupant compartment of the vehicle. The sensor control module also includes instructions to, responsive to a determination that no living object resides in the occupant compartment of the vehicle, control operation of the at least one radar sensor to discontinue radar scanning of the occupant compartment of the vehicle.

In another aspect of the embodiments described herein, a non-transitory computer readable medium is provided. The non-transitory computer readable medium has stored therein instructions, that when executed by a computing system, cause the computing system to perform functions comprising (a) if a vehicle is currently not moving, responsive to detection of a predetermined event of a first plurality of predetermined events, controlling operation of a at least one radar sensor to commence scanning of an occupant compartment of the vehicle at a first scanning rate; (b) responsive to an occurrence of a predetermined event of a second plurality of predetermined events following commencement of scanning at the first scanning rate, controlling operation of the at least one radar sensor to commence scanning of the occupant compartment of the vehicle at a second scanning rate different from the first scanning rate; (c) responsive to a passage of a predetermined time period after commencement of scanning at the second scanning rate, determining if a living object resides in the occupant compartment of the vehicle; and (d) responsive to a determination that no living object resides in the occupant compartment of the vehicle, controlling operation of the at least one radar sensor to discontinue radar scanning of the occupant compartment of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a system designed to control operation of vehicle sensors to conserve power. The system controls one or more vehicle sensors for monitoring an occupant compartment of a vehicle. The system may include one or more processors and a memory communicably coupled to the one or more processors. The memory may store a sensor control module including computer-readable instructions that when executed by the one or more processors cause the one or more processors to, if the vehicle is currently not moving, and responsive to detection of a predetermined event of a first plurality of predetermined events, control operation of at least one radar sensor to commence scanning of the occupant compartment of the vehicle at a first scanning rate. Responsive to an occurrence of a predetermined event of a second plurality of predetermined events following commencement of scanning at the first scanning rate, the at least one radar sensor may be controlled to commence scanning of the occupant compartment at a second scanning rate different from the first scanning rate. Responsive to a passage of a predetermined time period after commencement of scanning at the second scanning rate, radar sensor data may be analyzed to determine if a living object resides in the occupant compartment of the vehicle. Responsive to a determination that no living object resides in the occupant compartment of the vehicle, the at least one radar sensor may be controlled to discontinue radar scanning of the occupant compartment. The second scanning rate may be less than the first scanning rate, so that less energy is consumed at the second, lower scanning rate. The scanning rate used may depend on such factors as whether a living object is detected in the vehicle occupant compartment and whether or not the vehicle is moving. The system may also be designed to control (either alone or in conjunction with an autonomous deriving module) operation of other portions of the vehicle in response to sensor data acquired when scanning at the various scanning rates. For example, the at least one radar sensor may be operated at a relatively rapid first scanning rate when the vehicle is moving, to detect an out-of-position occupant as soon as possible. Responsive to detection of an out-of-position occupant by a radar sensor, the system may control vehicle operation so as to restrict a rate at which the vehicle front wheels may be autonomously turned (for example, to change lanes). This may limit the severity of vehicle maneuvers while an occupant is out of position, to reduce the risk of injury to the occupant.

Figure 1:
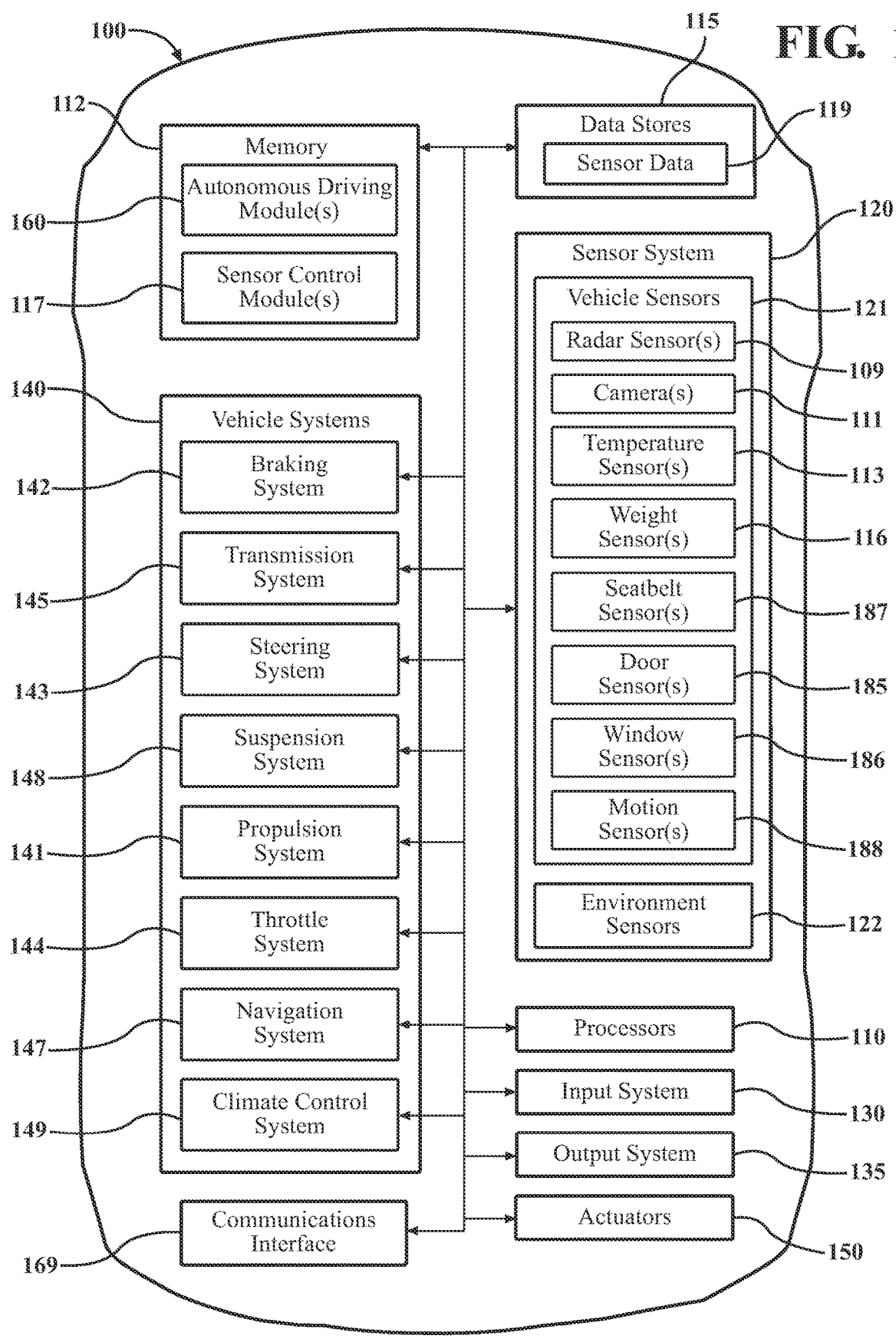
FIG. 1 illustrates a vehicle incorporating a system for controlling one or more vehicle sensors for monitoring an occupant compartment of the vehicle, in accordance with embodiments described herein.

Referring to FIG. 1, an example of a vehicle 100 is illustrated. As used herein, a "vehicle" is any form of motorized transport. In one or more implementations, the vehicle 100 is conventionally-powered or hybrid passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating a system for controlling one or more vehicle sensors for monitoring an occupant compartment of the vehicle, in accordance with embodiments described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more radar sensors 109 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system can acquire data of the vehicle occupant compartment, such as the number and positions of occupants, whether or not an occupant is out of position, detection of living objects, and other data described herein. The sensor system 120 can also acquire data of at least a portion of the external environment of the vehicle 100 (e.g., nearby objects).

The sensor system 120 can include any suitable type of sensor. Various examples of different types of sensors will be described herein. However, it will be understood that the embodiments are not limited to the particular sensors described.

Various examples of sensors of the sensor system 120 are described herein. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information to a cloud or other storage facility. The sensors may also be operably connected to other vehicle systems and components, such as data stores 115 and processor(s) 110, for storage and processing of vehicle and environmental sensor data. Sensor system 120 may include sensors configured to detect the current state or status of vehicle systems and components and to generate indications (for example, using trouble codes) possible malfunctions of vehicle systems and components.

The sensor system 120 can include one or more vehicle sensors 121. The vehicle sensor(s) 121 can detect, determine, and/or sense information about the vehicle 100 itself and/or any occupants inside the vehicle. In one or more arrangements, the vehicle sensor(s) 121 can be configured to detect events and conditions in the vehicle occupant compartment. The occupant compartment of the vehicle may comprise the enclosure in which the vehicle seats are located and/or in which vehicle occupants reside during travel in the vehicle.

In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed and acceleration/deceleration of the vehicle 100. The vehicle sensor(s) 121 may include vehicle directional sensors (not shown) configured to determine a current heading of the vehicle or direction in which the vehicle is pointed.

The vehicle sensor(s) 121 may include sensors configured to detect conditions and/or events inside the vehicle interior or occupant compartment. Such sensors may include temperature sensors 113 configured to detect occupant compartment temperature for purposes of occupant comfort. Motion sensors 188 (in addition to radar sensor(s) 109 (e.g., ultrasonic sensors) may detect movements of vehicle occupants. Camera(s) 111 may provide view(s) of the vehicle occupant compartment and detect and/or record events occurring in the occupant compartment. Seat weight sensors 116 may detect the presence of an object on associated vehicle seats operably connected to the weight sensors. In one or more arrangements, a weight sensor may be in an "off" or unpowered condition until an object (living or otherwise) is placed on a seat to which the sensor is operably connected for measuring the weight of an object placed in the seat. Seatbelt sensors 187 may detect buckled and unbuckled conditions of the vehicle seatbelts. Window sensors 186 may detect open and closed conditions of each vehicle window, and may also detect the amount or degree to which each window is open. Door sensors 185 may detect open and closed conditions of each vehicle door, and may detect the opening and closing of the doors by a vehicle occupant. Camera(s) 111 may acquire image information relating to vehicle occupants and their movements.

Radar sensor(s) 109 may be employed to detect the presence of living objects (e.g., people, pets) inside the vehicle occupant compartment. In one or more arrangements, one or more radar sensor(s) 109 may be positioned in the vehicle occupant compartment and are configured for detecting occupant positioning and movements. The radar sensor(s) 109 may be configured to scan the vehicle occupant compartment and distinguish between separate objects present therein. In one approach, the radar sensor(s) 109 may use an initial baseline scan from when the vehicle is empty as a point of comparison against a later scan to distinguish between separate, added objects. In further approaches, the radar sensor(s) 109 and/or a computing system operably connected thereto may implement a complex analysis of the radar sensor data, such as using a machine learning algorithm to analyze the radar data and detect/classify separate objects.

The radar sensor(s) 109 may be configured to distinguish between living objects and inanimate objects. For example, the radar sensor(s) may be capable of detecting movements of an occupant's chest during respiration. The radar sensor(s) may be configured to scan for objects having particular characteristics such as living objects smaller than a predetermined size. The radar sensor(s) 109 may be configured to distinguish features such as the locations and sizes of individual occupants.

Radar sensor(s) 109 may be configured to detect when an occupant is out of position. For example, the radar sensor(s) 109 may be configured to detect motions of a torso of an occupant. Any displacement of an occupant torso, either vertically or horizontally, beyond an associated predetermined threshold amount in relation to a known location of a vehicle seat may indicate that the occupant is unseated. If an occupant is determined to be unseated while the vehicle is moving, the occupant may be deemed to be out of position. In another example, if vehicle seat is determined to be occupied at a first point in time while the vehicle is moving and the seat is subsequently determined to be unoccupied while the vehicle is still moving, it may be determined that an occupant has left the seat while the vehicle is moving and is, therefore, out of position. In yet another example, certain zones or portions of the occupant compartment may be predefined as locations where a torso of an occupant should not reside when the vehicle is moving. If a vehicle sensor determines that the torso of an occupant is in one of these regions while the vehicle is moving, the occupant may be deemed to be out of position. "Out-of-position" may be defined in any suitable manner. For example, situationally and in consideration of a particular vehicle occupant compartment design.

In one or more arrangements, the radar sensor(s) 109 may be one or more ultra-wide band (UWB) radar sensors. It has been found that UWB radar is especially effective in detecting living objects in the occupant compartment, and also in distinguishing living objects from inanimate objects. This technology can also distinguish location, size, and further attributes of the vehicle occupants. The UWB radar can detect movement of objects. In particular arrangements, the UWB radar may be configured to scan for living objects smaller than a predetermined size.

In one or more configurations described herein, the UWB radar sensor may be an ultra-wideband radar operating in the frequency spectrum between 60 GHz and 79 GHz. In particular configurations, the sensor(s) may operate as an imaging radar at a frequency at or around 60 GHz for purposes of scanning the vehicle occupant compartment.

A single sweep of the radar scanner may scan the entire portion of the vehicle occupant compartment detectable in the field of vision of the radar sensor. A single sweep of the sensor and associated processing may produce a single frame of data. In one or more configurations, the radar sensor may operate at about 5 frames/per second (i.e., 5 sweeps per second). Operating under these parameters, it is desirable to acquire data for a period of 5-10 seconds to facilitate removal of anomalies from the data and provide a clear image. Thus, a "scan" may comprise enough sweeps to provide sufficient data to facilitate removal of anomalies from the data and provide a clear image. In one or more configurations, the maximum scanning rate is 5 sweeps per second.

In particular configurations, radar sensor power consumption may be between 170-280 mA per frame for active scanning at 5 frames/second at 12 volts DC, and 55 uA at a lowest scan rate contemplated herein. The entire radar sensor assembly (including, for example, microcontroller, associated circuitry and CAN transceiver hardware) may be configured for operation at 12 volts DC. Peak RF sweep power may be around 4.6 W.

In addition, the sensor system 120 can include one or more environment sensors 122 configured to acquire, and/or sense driving environment data. "Driving environment data" includes data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, etc. As an example, in one or more arrangements, the environment sensors 122 can include one or more radar sensors, one or more LIDAR sensors, one or more sonar sensors, and/or one or more cameras (not shown).

The vehicle wireless communications interface 169 may be configured to enable and/or facilitate communication between the components and systems of the vehicle and entities (such as cloud facilities, cellular and other mobile communications devices, other vehicles, etc.) exterior of the vehicle. For example, an alert caused by operation of the sensor control module 117 (described in greater detail below) may be transmitted to an off-vehicle person or facility via the wireless communications interface 169.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. In particular embodiments, the input system 130 may include buttons and/or switches enabling a user to stop or start the vehicle simply by actuating the buttons/switches.

The vehicle 100 can also include an output system 135. An "output system" includes any device, component, or arrangement or groups thereof that enable information/data to be presented to a vehicle occupant (e.g., a driver, a vehicle passenger, etc.) or a remote user.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, a throttle system 144, a suspension system 148, a transmission system 145, a climate control system 149, and/or a navigation system 147. Each of these systems can include one or more devices, components, and/or a combination thereof, now known or later developed.

The propulsion system 141 may include an engine (not shown) of the vehicle. The engine may be an internal combustion engine in a conventionally-powered vehicle, an internal combustion engine or an electric motor in a Hybrid electric-petroleum vehicle, or an electric motor in a fully electrically-powered vehicle, for example. The engine may be turned on in a conventional manner by activation of an ignition switch. In one or more arrangements, the ignition switch may be configured to be activatable by a human driver or vehicle occupant. In certain embodiments, the ignition switch may be configured to be turned "on" or "off" autonomously by a command from processor(s) 110 under instructions from one of the modules, such as sensor control module 117. Climate control system 149 may include the vehicle air conditioner, any heater(s), ducts, dedicated controls and/or any other components and/or sub-systems directed to controlling the climate in the occupant compartment.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The navigation system 147 may be configured to track the path of a vehicle along a travel route. The navigation system 147 may be configured to operate in conjunction with the autonomous driving module to guide the vehicle along a travel route selected by a user.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160 and/or the sensor control module(s) 117. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof (e.g., one or more of vehicle systems 140). The autonomous driving module(s) 160 may be configured to autonomously control the user vehicle so as to drive the vehicle along a travel route, from an initial or start location to a destination.

The processor(s) 110, the sensor control module 117, and/or the autonomous driving module(s) 160 can be operably connected to communicate with the other elements of the vehicle, including various vehicle systems 140 and/or individual components thereof. For example, returning to FIG. 1, the processor(s) 110, the sensor control module 117 and/or the autonomous driving module(s) 160 can be in communication to send and/or receive information from the various vehicle systems 140 to control the movement, speed, maneuvering, heading, direction, etc. of the vehicle 100. The processor(s) 110, the sensor control module 117 and/or the autonomous driving module(s) 160 may control some or all of these vehicle systems 140 and, thus, may be partially or fully autonomous.

The processor(s) 110, the sensor control module 117, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle may include a sensor control module 117. The sensor control module can be configured to receive data from the sensor system 120 and/or any other type of system capable of capturing information relating to the vehicle 100. The sensor control module may include computer-readable instructions that, when executed by the processor(s) 110, cause the processor(s) to control operation of one or more of the vehicle sensor(s) 121 as described herein, to help ensure efficient power management in the sensors. For example, one or more of sensor(s) 121 may be unpowered when not in use. The sensor control module 117 may further include computer-readable instructions that, when executed by the processor(s) 110, cause the processor(s) to use sensor data and/or other information to make determinations and perform (or cause performance of) operations as described herein. The vehicle 100 may include any and all sensors, mechanisms, systems (in the form of software and/or hardware), etc., needed for the sensor control module 117 to detect conditions and/or events and to make determinations based on the considerations and using the information described herein and any other available information. The sensor control module 117 may include computer-readable instructions that, when executed by the processor(s) 110, cause the processor(s) to activate, deactivate, and/or otherwise control vehicle components and/or systems and aspects of vehicle operation as described herein, responsive to data acquired by the vehicle sensors, the passage of various predetermined time periods, and/or the occurrence of other conditions and events. The sensor control module 117 may be configured to operate in conjunction with the autonomous driving module(s) 160 and/or any other vehicle component and/or system to control any operations of the vehicle 100 as described herein.

For example, the sensor control module 117 may include computer-readable instructions that, when executed by the processor(s) 110, cause the processor(s) to control operations such as generation of alerts, activation and deactivation of vehicle sensors 121, and changes to operating parameters (such as scan rates) of vehicle sensors. The sensor control module 117 may operate individually and/or in cooperation with the autonomous driving module(s) 160 and/or any other vehicle component(s) and/or system(s) to autonomously control aspects of vehicle operation as described herein. For example, the sensor control module 117 may operate individually and/or in cooperation with the autonomous driving module(s) 160 to autonomously control opening and closing of vehicle doors and windows, operation of vehicle climate control systems and components, and any other systems and/or components usable to perform the functions and operations described herein. Certain operations may be performed by the vehicle 100 or elements thereof based on a determination that the vehicle is currently moving. Certain operations may be performed by elements the vehicle 100 (such as one or more of modules 117, 160 and/or other portions of the vehicle) based on a determination that the vehicle is currently stationary. Operations may be performed by elements of the vehicle 100 based on the detection of certain events, such as the opening or closing of a vehicle door, a vehicle occupant moving out of position while the vehicle is moving, and other events. Operations may be performed by elements of the vehicle 100 based on the determination that certain conditions exist, such as whether the vehicle engine is turned on, whether a living object currently resides in the vehicle, and other conditions.

In one or more arrangements described herein, a system for controlling one or more of vehicle sensors 121 for monitoring an occupant compartment of a vehicle may include the processors 110 and memory 112 communicably coupled to the processor(s) 110 and storing the sensor control module 117. The sensor control module 117 may include computer-readable instructions that, when executed by the processor(s) 110, cause the processor(s) to, if the vehicle is currently not moving, responsive to detection of a predetermined event of a first plurality of predetermined events, control operation of at least one radar sensor to commence scanning of the occupant compartment of the vehicle at a first scanning rate. The instructions may cause the processor(s) to, responsive to an occurrence of a predetermined event of a second plurality of predetermined events following commencement of scanning at the first scanning rate, control operation of the at least one radar sensor to commence scanning of the occupant compartment of the vehicle at a second scanning rate different from the first scanning rate. The instructions may cause the processor(s) to, responsive to a passage of a predetermined time period after commencement of scanning at the second scanning rate, determine if a living object resides in the occupant compartment of the vehicle. The instructions may also cause the processor(s) to, responsive to a determination that no living object resides in the occupant compartment of the vehicle, control operation of the at least one radar sensor to discontinue radar scanning of the occupant compartment of the vehicle.

The instructions may cause the processor(s) to, responsive to a determination that a living object resides in the occupant compartment of the vehicle, determine if an engine of the vehicle is turned on. The instructions may also cause the processor(s) to, responsive to a determination that the vehicle engine is turned on, control operation of the at least one radar sensor to commence scanning of the vehicle occupant compartment at the first scanning rate. In one or more particular arrangements, the first scanning rate is a maximum scanning rate of the radar sensor. In one or more particular arrangements, the first scanning rate is one scan per second. In one or more particular arrangements, the second scanning rate is less than the first scanning rate. In one or more particular arrangements, the second scanning rate is one scan every 5 minutes.

Reducing the scanning rate(s) of the radar sensor(s) 109 and/or other vehicle sensors may reduce power consumption of the sensors (for example, performing a scan every 30 seconds will require more energy than performing the same scan every 5 minutes).

In one or more particular arrangements, the first plurality of predetermined events includes at least one of a vehicle door opening and closing, a switching of a vehicle ignition from an "off" state to an "on" state, and a detection of an object on at least one vehicle seat by a weight sensor configured to detect a presence of an object on the at least one vehicle seat. In one or more particular arrangements, the second plurality of predetermined events includes a vehicle ignition being switched from an "on" condition to an "off" condition, an opening of a vehicle door, a closing of a vehicle door, and a determination, based on scanning of the vehicle occupant compartment at the first scanning rate, that no living objects reside in the vehicle occupant compartment.

The instructions may also cause the processor(s) to, responsive to a determination that the vehicle engine is not turned on, control operation of the radar sensor(s) to commence scanning of the vehicle occupant compartment at a third scanning rate different from the first scanning rate and the second scanning rate. The instructions may cause the processor(s) to, after a predetermined number of radar scans have been performed at the third scanning rate, cause generation of at least a first alert indicating that a living object resides in the occupant compartment of the vehicle. In one or more arrangements, the third scanning rate is less than the first scanning rate and greater than the second scanning rate. In one or particular more arrangements, the third scanning rate is one scan every 30 seconds.

The instructions may cause the processor(s) to, responsive to a determination that the vehicle engine is not turned on, activate at least one weight sensor associated with at least one vehicle seat. The instructions may also cause the processor(s) to, responsive to the occurrence of the predetermined event of the first plurality of predetermined events, activate at least one weight sensor associated with at least one vehicle seat, and activate at least one seatbelt sensor associated with the at least one vehicle seat. The instructions may cause the processor(s) to, responsive to the occurrence of the predetermined event of the second plurality of predetermined events, deactivate the at least one weight sensor and the at least one seatbelt sensor associated with the at least one vehicle seat.

The instructions may cause the processor(s) to, if the vehicle is currently moving, and responsive to a determination that a vehicle occupant is out of position, autonomously control operation of the vehicle so that a maximum rate at which vehicle front wheels can be autonomously rotated is inversely proportional to a speed of the vehicle. The instructions may cause the processor(s) to, if the vehicle is currently moving, responsive to a determination that a vehicle occupant is out of position, cause generation of at least a first alert indicating that a vehicle occupant is out of position.

Operation a system for controlling one or more vehicle sensors in accordance with an embodiment described herein will now be discussed with reference to FIGS. 2-4B.

Figure 2:
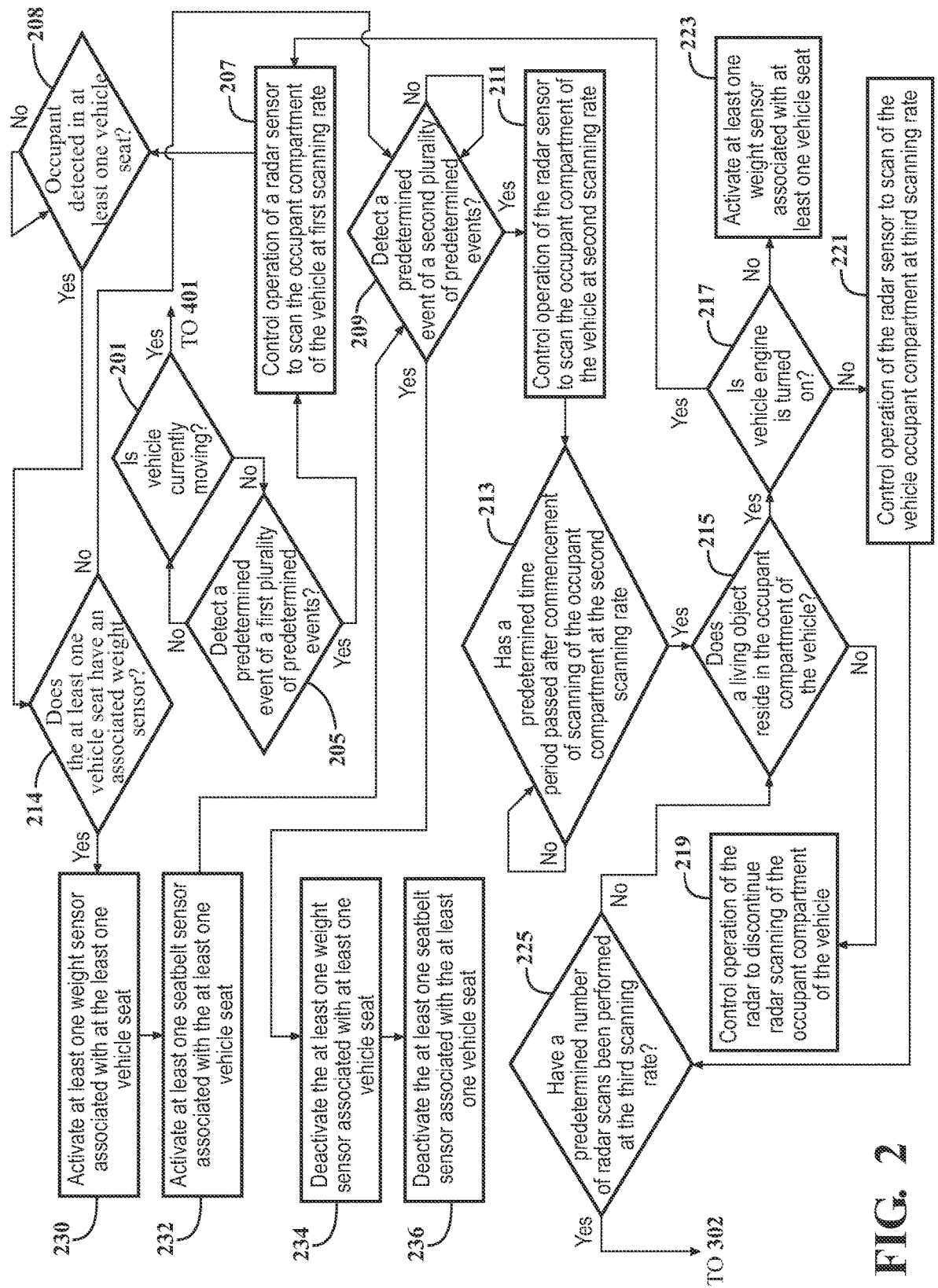
FIG. 2 is a flow diagram illustrating operations of the vehicle sensors and other portions of the vehicle when the vehicle is currently non-moving, and consequent to a determination as to whether a living object currently resides in the vehicle occupant compartment.

Referring to FIG. 2, in one or more arrangements, the sensor control module may include instructions to determine (in block 201) whether or not the vehicle 100 is currently moving. If the vehicle 100 is currently not moving, the sensor control module 117 may (in block 205) constantly monitor any vehicle occupants and the vehicle (including the occupant compartment) for the occurrence of a predetermined event of a first plurality of predetermined events. Occurrence of an event of the first plurality of predetermined events may be detected, for example, by one or more of the vehicle sensors 121.

The first plurality of predetermined events may include various events which may trigger commencement of scanning of the vehicle occupant compartment at a first scanning rate. In certain embodiments, a non-limiting list of events of the first plurality of predetermined events may include at least one of a vehicle door opening and closing, a switching of a vehicle engine from an "off" state to an "on" state, and a detection of an object (for example, a vehicle occupant) on at least one vehicle seat by a weight sensor configured to detect the presence of an object on the at least one vehicle seat. The first plurality of predetermined events may also include one or more additional events.

Returning to block 205, responsive to detection of a predetermined event of a first plurality of predetermined events, the sensor control module 117 may (in block 207) control operation of one or more radar sensors (such as radar sensor(s) 109) to commence radar scanning of the occupant compartment of the vehicle 100 at a first scanning rate. In certain embodiments, the first scanning rate may a maximum scanning rate of a radar sensor. In other embodiments, the first scanning rate may a rate less than a maximum scanning rate of the radar sensor. The radar sensor(s) 109 may be turned off or de-powered prior to commencement of scanning at the first scanning rate, or the radar sensor(s) may be scanning at a rate different from the first scanning rate prior to commencement of scanning at the first scanning rate. In configurations where multiple radar sensors are used, the sensors may be operated so as to scan at the same scanning rate.

In block 208, the sensor control module 117 may determine from radar scan data if an occupant is detected in at least one vehicle seat. If an occupant is detected in at least one vehicle seat, the sensor control module 117 may (in block 214) determine if the at least one vehicle seat is in operable communication with has an associated weight sensor.

In block 230, responsive to a determination that the at least one vehicle seat has a weight sensor associated therewith, the sensor control module may activate the weight sensor associated with at least one vehicle seat. The weight sensor may be operably connected to or in communication with an associated vehicle seat in which an occupant may sit or is sitting. In one or more arrangements, a weight sensor associated with the vehicle seat may be configured to activate automatically when an occupant sits in the seat to which the sensor is operably connected.

In block 232, the sensor control module may also activate a seatbelt sensor in communication with a seatbelt of the seat with which the weight sensor of block 230 is connected. Activation of the sensors in blocks 230 and 232 may facilitate detection of occupants in particular vehicle seats and aid in determining when the occupants are seated in the seats and secured by seatbelts. Control may then proceed to block 209.

Returning to block 214, if the at least one vehicle seat does not have an associated weight sensor, control may proceed to block 209.

In block 209, the sensor control module 117 may, following commencement of scanning at the first scanning rate, constantly monitor any vehicle occupants and the vehicle 100 (including the occupant compartment) for the occurrence of a predetermined event of a second plurality of predetermined events. The second plurality of predetermined events may include various events which trigger commencement of scanning of the vehicle occupant compartment at the second scanning rate. The second scanning rate may be lower than the first scanning rate. Thus, the occurrence of an event and/or the existence of a condition as represented by the events of the second plurality of predetermined events may enable radar sensor scans to be performed at a lower scan rate to conserve power. This may be implemented where, for example, it is relatively less important for the affected sensor to detect the presence of a condition or change in condition within the vehicle occupant compartment as soon as possible. For example, if the vehicle engine is switched from an "on" condition to an "off", it may be necessary to conserve battery power for operation of the vehicle sensors and other vehicle systems and components while the engine is off.

In certain embodiments, the second plurality of predetermined events includes events that may indicate that one or more occupants have left or are leaving the vehicle. A non-limiting list of events of the second plurality of predetermined events may include the vehicle engine being switched from an "on" condition to an "off" condition, an opening of a vehicle door, a closing of a vehicle door, and a determination, based on radar scanning of the vehicle occupant compartment at the first scanning rate, that no living objects reside in the vehicle occupant compartment. The second plurality of predetermined events may also include one or more additional events.

In block 234, responsive to detection of a predetermined event of the second plurality of predetermined events, the sensor control module 117 may deactivate or power down weight sensors associated with one or more vehicle seats. The sensor control module may also (in block 236) deactivate or power down seatbelt sensors in communication with seatbelts of the vehicle seats referred to in block 234. Deactivation of these sensors may be performed based on an assumption that occupants are exiting the vehicle and that the weight and seatbelt sensors will therefore not be needed.

Returning to block 209, responsive to an occurrence of a predetermined event of a second plurality of predetermined events following commencement of scanning at the first scanning rate, the sensor control module 117 may (in block 211) also control operation of the radar sensor(s) 109 to commence scanning of the occupant compartment of the vehicle at a second scanning rate. The second scanning rate may be different from the first scanning rate. In one or more arrangements, the second scanning rate is less than the first scanning rate. In particular embodiments, the second scanning rate is one scan per second. The ability of the sensor control module 117 to control a scanning rate of the radar sensor(s) 109 (and, optionally, other ones of vehicle sensors 121) according to various events and conditions as described herein enables the power usage of the sensors to be optimized (i.e., the sensors may be operated so as to expend the minimum amount of power needed for scanning responsive to particular events and conditions). This is particularly important in situations where the vehicle engine of turned off and the vehicle sensors 121 must draw power from the vehicle battery in order to operate.

The sensor control module 117 may include instructions to, under certain conditions, control operation of the vehicle 100 to autonomously turn the vehicle engine on if it is determined that operation of the vehicle sensors 121 and/or other vehicle systems and components as deemed necessary would drain the battery below a predetermined level, or if the battery would be incapable of supplying sufficient power for the actions to be performed by the vehicle 100.

In block 213, the sensor control module 117 may monitor for the passage of a predetermined time period after commencement of scanning at the second scanning rate. In one or more arrangements, the predetermined time period may be in the range of 120 seconds.

In block 215, the sensor control module 117 may, responsive to a passage of a predetermined time period after commencement of scanning at the second scanning rate, determine if a living object resides in the occupant compartment of the vehicle. A "living object" may be a person or a pet or other animal. In one or more arrangements, the determination may be made by analysis of data from radar scans. In one or more arrangements, the determination may be made by analysis of data from radar scans in combination with data from other sensors.

Responsive to a determination that no living object resides in the occupant compartment of the vehicle after passage of the predetermined time period after commencement of scanning at the second scanning rate, sensor control module 117 may (in block 219) control operation of the radar to discontinue radar scanning of the occupant compartment of the vehicle. In this case, discontinuing of radar scanning may be based on a determination that it is less important to detect events and/or changes in the vehicle occupant compartment if a living object is not present in the occupant compartment. Also, such events and/or changes may also be less likely to occur if a living object is not present in the occupant compartment.

Returning to block 215, the sensor control module may include instructions to, responsive to a determination that a living object resides in the occupant compartment of the vehicle after passage of the predetermined time period after commencement of scanning at the second scanning rate, determine (in block 217) if the vehicle engine is turned on.

Responsive to a determination in block 217 that the vehicle engine is not turned on, the sensor control module may (in block 223) activate at least one weight sensor associated with at least one vehicle seat. The at least one weight sensor may be configured to measure the presence of an object in the vehicle seat and/or a weight of the object. Activation of the weight sensor may aid in determining the location of the living object in the occupant compartment. If more than one living object is detected to be present in the occupant compartment, more than one weight sensor may be activated. The location(s) of the weight sensor(s) to be activated initially may be determined by an analysis of the radar scans.

Responsive to a determination in block 217 that the vehicle engine is turned on, the sensor control module may also return control to block 207, to commence scanning of the vehicle occupant compartment by the radar sensor(s) at the first scanning rate.

However, responsive to a determination in block 217 that the vehicle engine is not turned on, the sensor control module may (in block 221) control operation of the radar to commence radar scanning of the vehicle occupant compartment at a third scanning rate. This step may help conserve the energy used by the radar sensor(s) 109 with the engine off, while still enabling the vehicle occupant compartment to be scanned. In one or more arrangements, the third scanning rate is less than the first scanning rate and greater than the second scanning rate.

Following block 221, the sensor control module 117 may (in block 225) monitor scanning of the occupant compartment at the third scanning rate to determine when a predetermined number of radar scans have been performed at the third scanning rate.

Starting in block 225, until the predetermined number of radar scans has been performed at the third scanning rate, control may pass after each scan at the third scanning rate to block 215, where it is determined whether a living object still resides in the occupant compartment. If a living object is detected in the occupant compartment in block 215, the sensor control module 117 may (in block 217) determine if the engine is on as previously described. If the engine is not on, the sensor control module 117 may (in block 221) once again control the radar sensor(s) to scan the occupant compartment at the third scanning rate. This sequence may continue until it is determined that the predetermined number of scans at the third rate has been performed, after which control may pass to block 302. Control will then move forward as previously described until the predetermined number of radar scans have been performed at the third scanning rate.

Figure 3A:
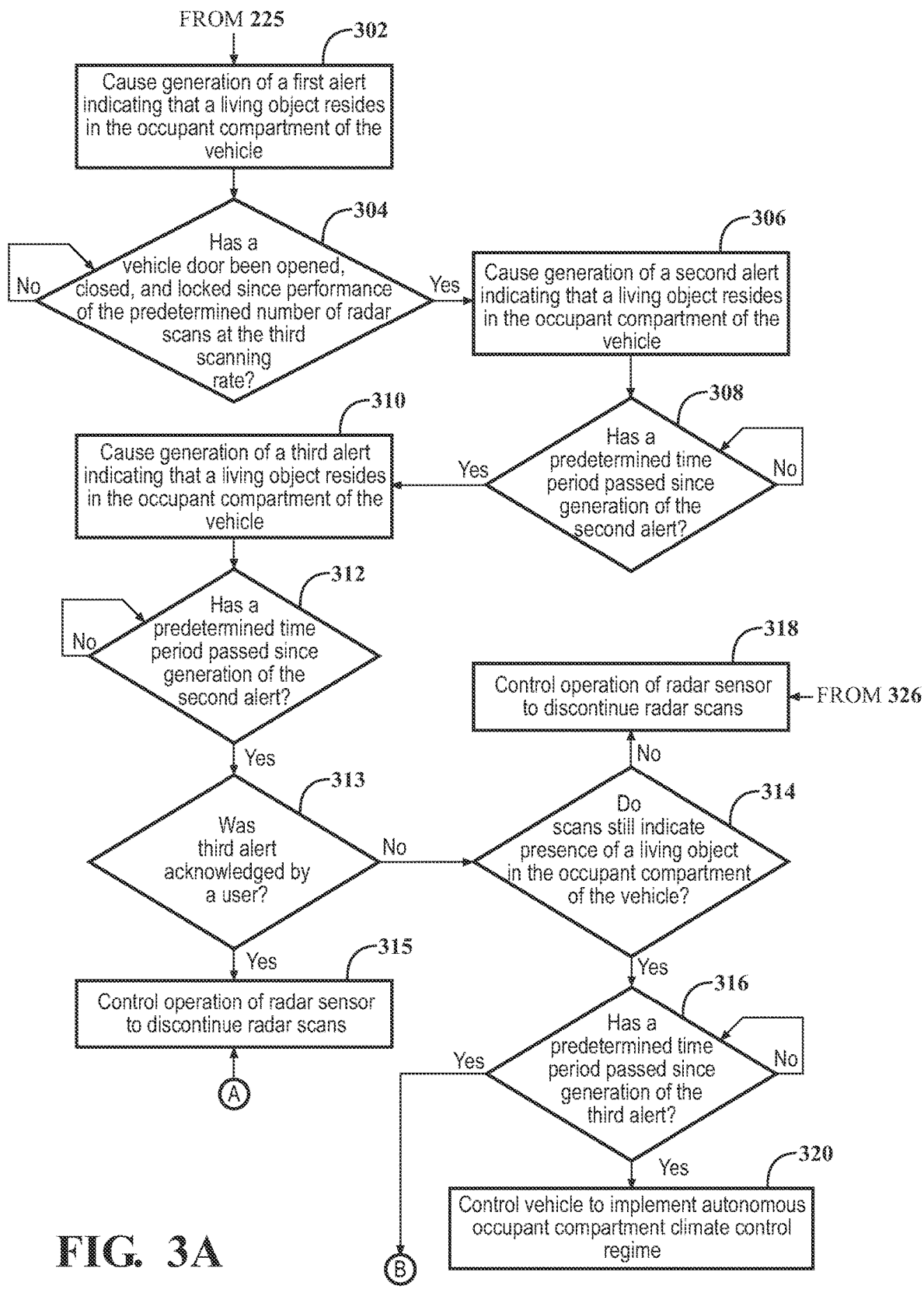
FIG. 3A is a flow diagram illustrating further operations of the vehicle sensors and other portions of the vehicle when it is determined that a living object currently resides in the vehicle occupant compartment.
Figure 3B:
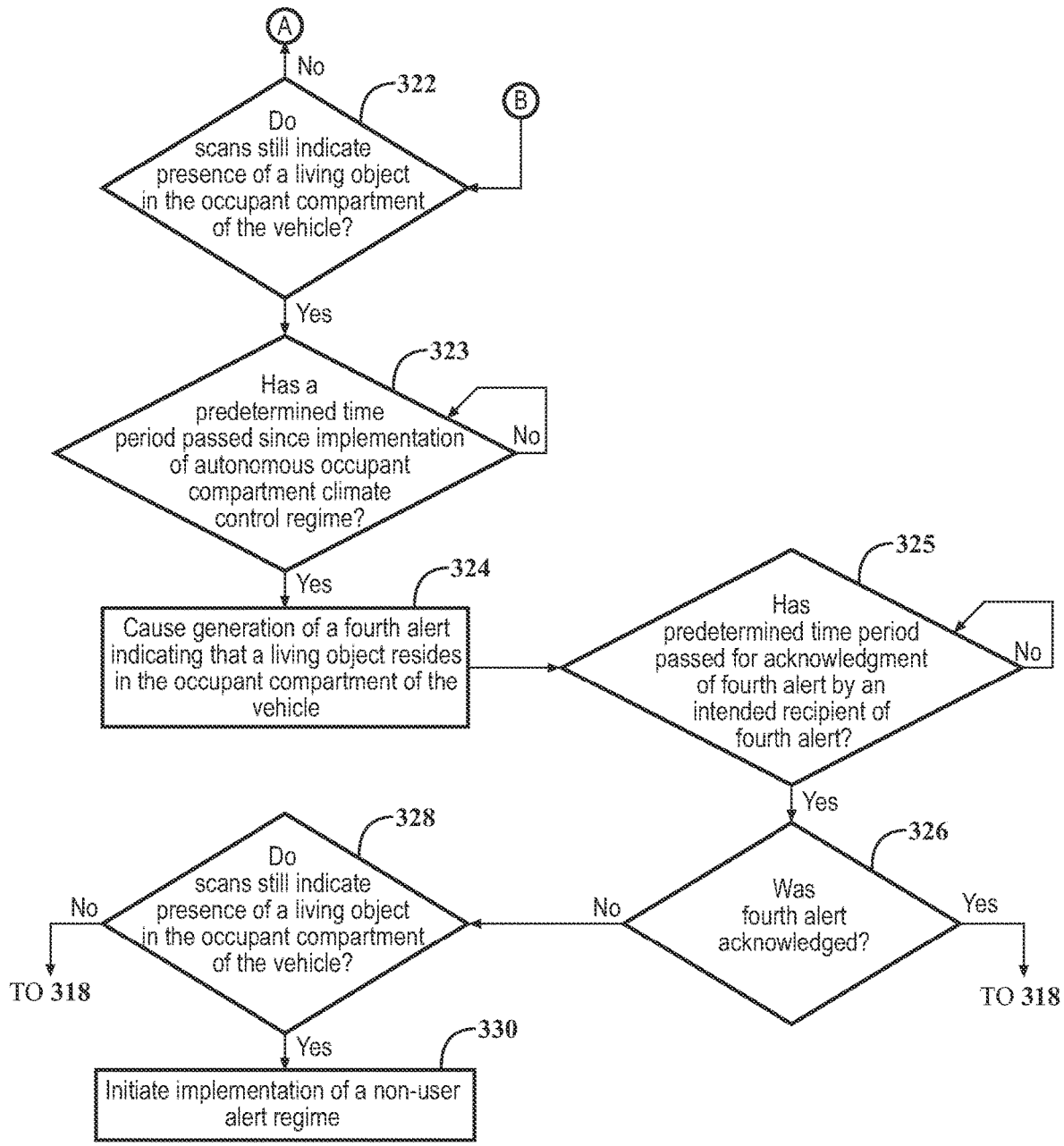
FIG. 3B is a flow diagram illustrating still further operations of the vehicle sensors and other portions of the vehicle when it is determined that a living object currently resides in the vehicle occupant compartment.

Referring now to FIGS. 3A and 3B, when the predetermined number of radar scans have been performed at the third scanning rate, the sensor control module may (in block 302) cause generation of at least a first alert indicating that a living object resides in the occupant compartment of the vehicle. The first alert is directed to notifying a vehicle occupant or former occupant that a living object (such as a child or a pet) is still in the vehicle (block 215), even though the vehicle engine is off (block 217). Any of the alerts described herein may be in any suitable form, such as audible, visual, tactile or a combination of these. In one or more arrangements, the first alert may be an audible alert in the form of the same vehicle-generated sound used as a reminder to occupants to buckle their seatbelts. The first alert may also include (via output system 135) visuals of the vehicle seats and/or a visual of a detected occupant in a vehicle seat.

Following generation of the at least a first alert, additional alerts may be generated if the first alert is not acknowledged. Successive alerts may increase in intensity and involve the transmission of messages via a wide variety of media, and to a wide variety of recipients. Any alerts generated may include a request for response or acknowledgement of receipt of the alert by the recipient.

In block 302, the sensor control module may cause generation of a first alert indicating that a living object currently resides in the occupant compartment of the vehicle. In block 304, the sensor control module may, after causing generation in block 302 of at least a first alert indicating that a living object resides in the occupant compartment of the vehicle, monitor the vehicle doors to determine if a vehicle door has been opened and subsequently closed (or detect when a door is opened and closed) after performance of the predetermined number of radar scans at the third scanning rate. The determination may be made using data from door sensors 185, for example.

If it is determined in block 304 that a vehicle door has been opened and subsequently closed and locked, the sensor control module 117 may, in block 306, cause generation of a second alert indicating that a living object currently resides in the occupant compartment of the vehicle. In one or more arrangements, the second alert may be in the form of a car horn and/or flashing lights to attract the attention of an occupant/ex-occupant.

In block 308, the sensor control module 117 may monitor for the passage of a predetermined time period after generation of the second alert in block 306. After passage of the predetermined time period after generation of the second alert, the sensor control module may (in block 310) cause generation of a third alert indicating that a living object currently resides in the occupant compartment of the vehicle. In one example of a third alert, the sensor control module may cause generation of a text message alerting the vehicle owner of the presence of a living object inside the vehicle.

After generation of the third alert, the sensor control module 117 may (in bock 312) wait a predetermined time period for an acknowledgement of the third alert by an intended recipient of the third alert. In block 313, the sensor control module 117 may determine if the third alert was acknowledged within the predetermined time period. If the third alert was acknowledged, the sensor control module 117 may (in block 315) control operation of the radar sensor(s) to discontinue radar scans, since the third alert was acknowledged. However, after passage of the predetermined time period, if the third alert was not acknowledged, the sensor control module 117 may (in block 314) determine if a living object still resides in the occupant compartment of the vehicle.

Responsive to a determination that a living object does not currently reside in the occupant compartment of the vehicle, the sensor control module 117 may (in block 318) control operation of the radar sensor(s) to discontinue radar scans, since there is no longer a need to determine when the living object is no longer inside the vehicle. However, if it is determined in block 314 that a living object still resides in the occupant compartment of the vehicle, the sensor control module may (in block 316) wait until passage of a predetermined time period after generation of the third alert.

After passage of the predetermined time period in block 316, the sensor control module 117 may (in block 320) control operation of the vehicle to start implementation of an autonomous occupant compartment climate control regime. The autonomous occupant compartment climate control regime may be implemented at this point because the previous alerts indicating that a living object (for example, a forgotten child or pet) is still inside the vehicle have not been acknowledged, and it may be necessary to autonomously control the climate in the occupant compartment until someone opens the vehicle to retrieve the living object. The autonomous occupant compartment climate control regime may comprise a set of conditional commands directed to controlling the temperature, air quality, humidity, and/or other environmental characteristics of the occupant compartment based on feedback from temperature and other vehicle sensors. For example, the vehicle HVAC system may be controlled to maintain the temperature of the occupant compartment within a predetermined range, despite conditions of excessive heat or cold outside the vehicle. If necessary to supply power to the vehicle systems, the sensor control module may control operation of the vehicle to start the engine and run the engine to power vehicle system and/or charge the vehicle battery.

Returning to block 316, after passage of the predetermined time period since generation of the third alert, the sensor control module 117 may also determine (in block 322) is a living object still resides in the occupant compartment. If no living object resides in the occupant compartment, the sensor control module may (in block 315) control operation of the radar sensor(s) to discontinue radar scans.

However, if it is determined in block 322 that a living object still resides in the occupant compartment, the sensor control module 117 may (in block 323) monitor for the passage of a predetermined time period after initiation of the autonomous occupant compartment climate control regime in block 320. Following passage of the predetermined time period after initiation of the autonomous occupant compartment climate control regime, the sensor control module may (in block 324) cause generation of a fourth alert indicating that a living object resides in the occupant compartment of the vehicle. The fourth alert may be sent to all vehicle owner home and personal smart devices (for example, Amazon Alexa, Google Home, etc.) and e-mail. The sensor control module may also begin to track a passage of time since generation of the fourth alert.

After generation of the fourth alert in block 324, the sensor control module 117 may (in block 325) wait a predetermined time period for an acknowledgement of the fourth alert by an intended recipient of the fourth alert. In block 326, after passage of the predetermined time period for acknowledgement of the fourth alert, if the fourth alert has been acknowledged, control may transfer to block 318 where the sensor control module 117 controls operation of the radar sensor(s) to discontinue radar scans. However, if the fourth alert has not been acknowledged, the sensor control module may (in block 328) determine if a living object still resides in the occupant compartment.

In block 328, if a living object no longer resides in the occupant compartment, control may transfer to block 318 where the sensor control module controls operation of the radar sensor(s) to discontinue radar scans. However, if a living object still resides in the occupant compartment, the sensor control module may (in block 330) initiate implementation of a non-user alert regime directed to alerting entities besides the vehicle owner that a living object currently resides in the occupant compartment of the vehicle. At this point in time, multiple alerts to the vehicle owner have gone unacknowledged, and it is deemed critical to notify any entity that can go immediately to the vehicle to help the living object.

The non-user alert regime generates alerts to multiple entities other than the vehicle owner regarding the presence of a living object in the vehicle, the location of the vehicle, etc. In addition, further alerts may also be sent to the vehicle owner. For example, a vehicle manufacturer safety center may be notified by pre-recorded phone message, by text, and by any other available means. The vehicle manufacturer safety center may access vehicle systems remotely and use vehicle data telemetry to identify the vehicle location, owner, environmental conditions in the occupant compartment, the number and type of living objects in the vehicle, etc. The vehicle manufacturer safety center agent can also take multiple additional actions, such as calling 911 local to the vehicle location, attempting again to notify the vehicle owner and other entities, supervisory monitoring and control of vehicle climatic conditions, and any other actions which may maintain vehicle climate and facilitate outside aid to the vehicle. In one or more arrangements, alerts may also be transmitted to "partner" entities (such as stores, restaurants, etc.) who have agreed to work with the vehicle manufacturer safety center and/or local civil authorities for purposes of locating and/or informing a vehicle owner of an emergency situation such as described herein. For example, if it is determined or believed that the vehicle owner is shopping at a store where the vehicle is parked, a message may be transmitted over the store public address system regarding an issue with the vehicle, which may be identified by license plate number, vehicle physical description, owner name, etc.

Returning now to block 201 (FIG. 2), if it is determined that the vehicle 100 is currently moving, the sensor control module may (in block 401, FIG. 4A) control operation of one or more radar sensor(s) (such as radar sensor(s) 109) to commence radar scanning of the occupant compartment of the vehicle at the first scanning rate, as previously described. Radar scanning at the first scanning rate may be performed to determine as soon as possible when a vehicle occupant is out of position in the moving vehicle.

In block 402, the sensor control module may constantly process the radar sensor data to detect an out-of-position vehicle occupant. In block 403, responsive to a determination that a vehicle occupant is out of position, the sensor control module 117 may cause generation of a first alert indicating that a vehicle occupant is out of position. The first alert may be directed to informing vehicle occupants that an occupant is determined to be out of position, and to give out-of-position occupants an opportunity to be seated.

In addition, responsive to a determination that a vehicle occupant is out of position, the sensor control module 117 may also (in block 404) autonomously control the vehicle so that a maximum rate at which vehicle front wheels can be autonomously rotated (for example, by autonomous rotation of the steering wheel) is inversely proportional to vehicle speed. This step is directed to limiting the severity of maneuvers the vehicle can autonomously perform with an occupant who is out of position. For example, a maximum rate of rotation of the front wheels with respect to a fore-aft axis of the vehicle may be limited to 1°/second when the vehicle speed is 50 mph, while the maximum rate of rotation of the front wheels with respect to a fore-aft axis of the vehicle may be limited to 5°/second when the vehicle speed is 20 mph. Limiting the rate at which the front wheels can be autonomously rotated may prevent excessively sharp turns by the autonomous driving module(s) 160. This may be applied only to autonomous vehicle controls, so that a human driver may still have full control of the vehicle steering. The human driver may assume full control of the vehicle at any time. In one or more arrangements, the control of the vehicle described with regard to block 404 may be implemented simultaneously with generation of the alert in block 404.

In block 405, the sensor control module 117 may wait for passage of a predetermined out-of-position time period after detection of an out-of-position occupant to give the out-of-position occupant an opportunity to be seated. In block 406, after passage of the predetermined out-of-position time period, the sensor control module 117 may determine if an occupant is still out of position (for example, using radar sensor data). If no occupants are currently out of position, it may be assumed that the occupant that was out of position as been seated. Control may then transfer back to block 401, where the radar sensor(s) may be controlled to scan the occupant compartment at the first scanning rate to detect a situation where an occupant is again out of position.

However, if an occupant is still out of position, the sensor control module 117 may (in block 407) autonomously control the vehicle so as to reduce vehicle speed at a rate within a predetermined range until the vehicle speed is less than a predetermined speed. This step may be directed at autonomously slowing the vehicle to a lower, relatively safer speed because an out-of-position occupant was detected in the vehicle and has not been seated responsive to the alert generated in block 403. In one or more arrangements, the predetermined speed may be 15 mph, and the range of rate of speed reduction may be 1-3 mph/second.

In block 408, the sensor control module 117 may wait for passage of a predetermined speed reduction time period after reduction of the vehicle speed to a speed less than the predetermined speed. In block 410, after passage of the predetermined speed reduction time period, the sensor control module may determine if all vehicle occupants are seated with seatbelts applied. This determination may be made using radar sensor data, seat and seatbelt sensor data, and any other available information.

If it is determined that all occupants are seated and belted, the sensor control module 117 may (in block 411) control operation of the vehicle to deactivate the out-of-position occupant commands generated in blocks 403, 404, 407, enabling the vehicle to proceed with normal operations. However, if it is determined that all occupants are not seated and belted, the sensor control module may (in block 412) control operation of the vehicle pull the vehicle over to a nearest safe stopping area. This may enable an out-of-position occupant to be seated before the vehicle starts moving again. The nearest safe stopping area may be determined by any suitable method, for example, with reference to maps available through the navigation system 147 and/or other sources, such as information available wirelessly from the cloud or other sources via the communications interface 169 or via a personal communications device.

Figure 4A:
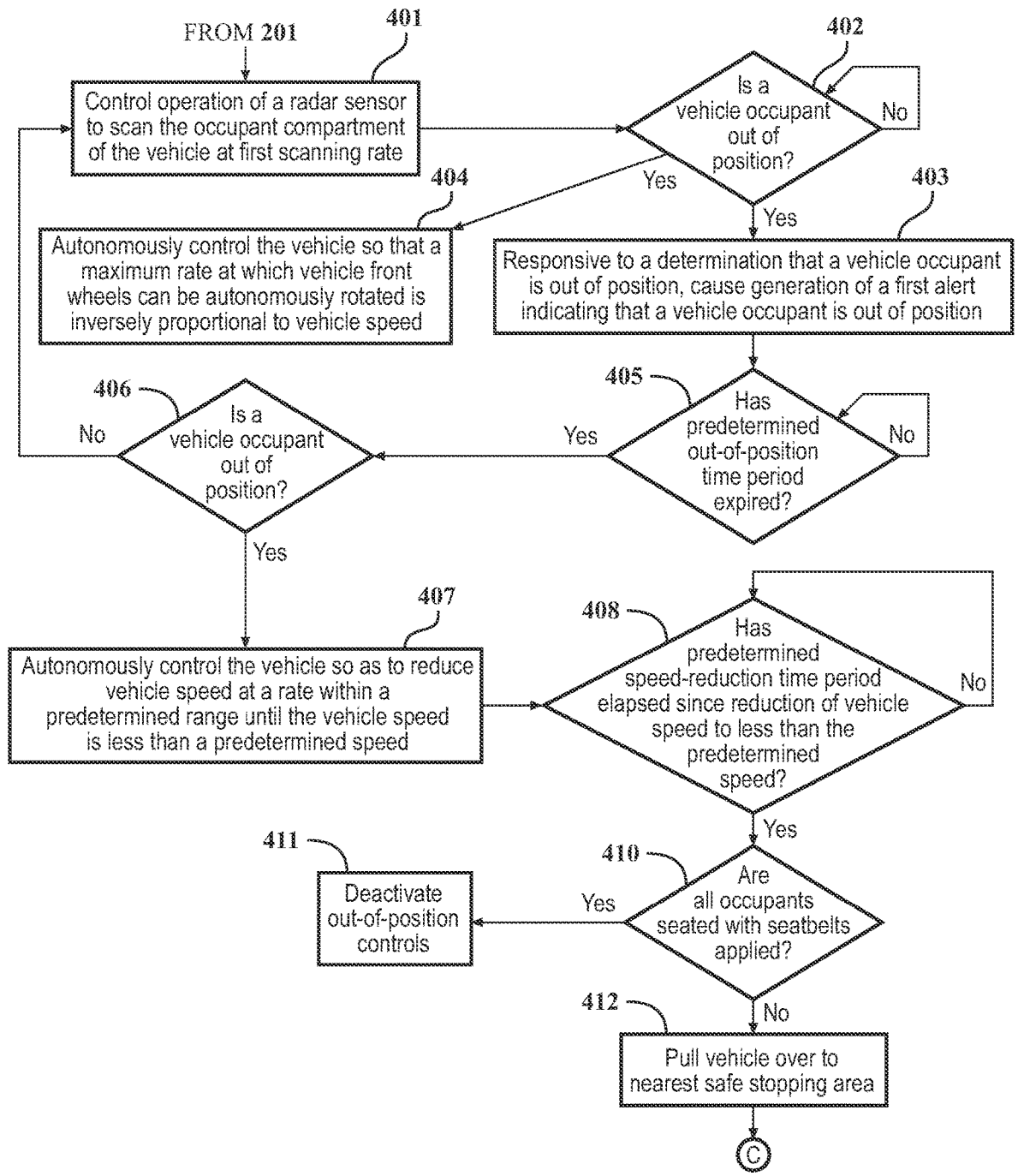
FIG. 4A is a flow diagram illustrating operations of the vehicle sensors and other portions of the vehicle when the vehicle is currently moving, and consequent to a determination as to whether a vehicle occupant is out of position.
Figure 4B:
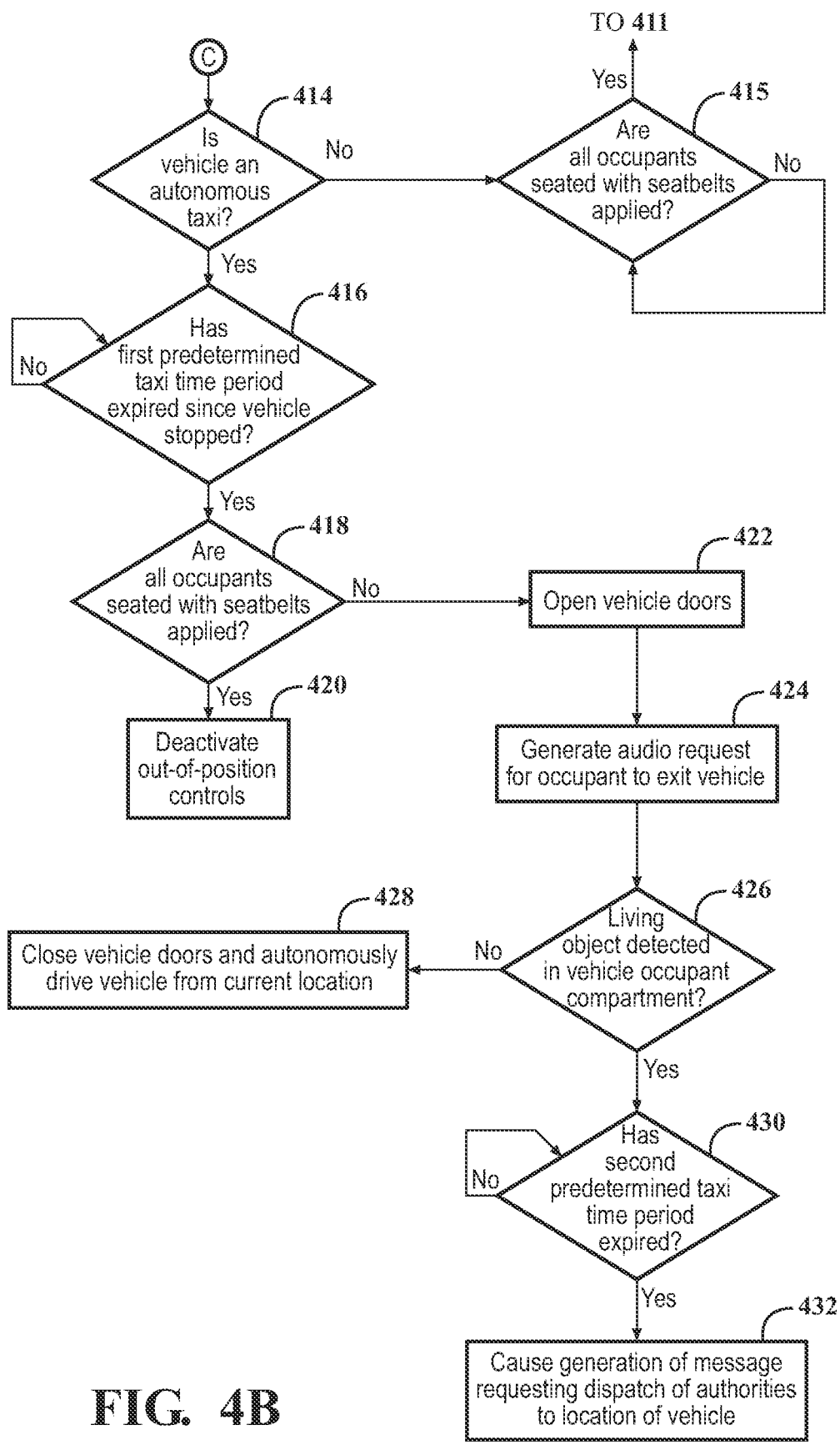
FIG. 4B is a flow diagram illustrating operations of the vehicle sensors and other portions of the vehicle when the vehicle is currently moving, an out-of-position occupant has been detected, and the vehicle is determined to be an autonomous taxi.

Referring to FIG. 4B, in addition, a particular set of control options may be exercised if the vehicle 100 is an autonomous taxi tasked with autonomously driving paying customers from one location to another. These commands may be directed to convincing an out-of-position occupant to regain his seat so that the ride may be continued. Failing this, the occupant may be asked to exit the vehicle or authorities may be dispatched to interact with the occupant. After the vehicle 100 has stopped and during the time when any occupant is determined to be out-of-position, the sensor control module 117 may (in block 414) control the radar sensor(s) 109 to scan the occupant compartment at the first scanning rate.

In block 414, after the vehicle has pulled over to a safe stopping area (or while the vehicle is in the process of pulling over), the sensor control module 117 may determine if the vehicle is an autonomous taxi. If the vehicle is not an autonomous taxi, the sensor control module may (in block 415) determine if all vehicle occupants are seated with seatbelts applied, in a manner similar to that in block 410. If all vehicle occupants have been seated with seatbelts applied, it may be determined that there are no longer any occupants out of position. Control may then pass to block 411, where any out-of-position controls may be deactivated as previously described.

However, if the vehicle is an autonomous taxi, the sensor control module 117 may (in block 416) wait for expiration of a first predetermined taxi time period after the vehicle has stopped. After passage of the first predetermined taxi time period, the sensor control module 117 may (in block 418) determine if all vehicle occupants are seated with seatbelts applied. If it is determined that all occupants are seated and belted, the sensor control module 117 may (in block 420) control operation of the vehicle to deactivate the out-of-position occupant commands as previously described, enabling the vehicle to proceed with normal operations. However, if all occupants are not seated and belted by this time, the sensor control module 117 may (in block 422) control operation of the vehicle 100 to open one or more of the vehicle doors. This operation may be accompanied by an audio message (in block 424) in the occupant compartment directing the vehicle occupant(s) to exit the vehicle if they refuse to be seated and apply seatbelts.

In block 426, the sensor control module 117 may then determine if a living object resides in the occupant compartment. If no living object resides in the occupant compartment, it may be assumed that any vehicle occupants have exited the vehicle 100 per instructions. The sensor control module 117 may the (in block 428) close the vehicle doors and autonomously drive the vehicle from its current location to a dispatch area or other destination. However, if a living object is detected in the occupant compartment, the sensor control module 117 may (in block 428) wait for expiration of a second predetermined taxi time period since detection of an out-of-position occupant in block 426. After expiration of the second predetermined taxi time period, the sensor control module may (in block 432) cause generation of a message requesting dispatch of authorities to interact with the occupant.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4B, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling one or more vehicle sensors for monitoring an occupant compartment of a vehicle, the system comprising:
   one or more processors; and
   a memory communicably coupled to the one or more processors and storing a sensor control module including computer-readable instructions that when executed by the one or more processors cause the one or more processors to:
   if the vehicle is currently not moving, and responsive to detection of a predetermined event of a first plurality of predetermined events, control operation of at least one radar sensor to commence scanning of the occupant compartment of the vehicle at a first scanning rate;
   responsive to an occurrence of a predetermined event of a second plurality of predetermined events following commencement of scanning at the first scanning rate, control operation of the at least one radar sensor to commence scanning of the occupant compartment of the vehicle at a second scanning rate different from the first scanning rate;
   responsive to a passage of a predetermined time period after commencement of scanning at the second scanning rate, determine if a living object resides in the occupant compartment of the vehicle; and
   responsive to a determination that no living object resides in the occupant compartment of the vehicle, control operation of the at least one radar sensor to discontinue radar scanning of the occupant compartment of the vehicle, and
   wherein the sensor control module includes computer-readable instructions that when executed by the one or more processors cause the one or more processors to, responsive to a determination that the engine of the vehicle is not turned on, control operation of the at least one radar sensor to commence scanning of the vehicle occupant compartment at a third scanning rate that is less than the first scanning rate and greater than the second scanning rate.

2. The system of claim 1, wherein the sensor control module includes computer-readable instructions that when executed by the one or more processors cause the one or more processors to, if the vehicle is currently moving, and responsive to a determination that a vehicle occupant is out of position, autonomously control operation of the vehicle so that a maximum rate at which vehicle front wheels can be autonomously rotated is inversely proportional to a speed of the vehicle.

3. The system of claim 1, wherein the sensor control module includes computer-readable instructions that when executed by the one or more processors cause the one or more processors to, if the vehicle is currently moving, and responsive to a determination that a vehicle occupant is out of position, autonomously control operation of the vehicle so as to reduce vehicle speed at a rate within a predetermined range until the vehicle speed is less than a predetermined speed.

4. The system of claim 1, wherein the sensor control module includes computer-readable instructions that when executed by the one or more processors cause the one or more processors to:
   responsive to a determination that a living object resides in the occupant compartment of the vehicle, determine if an engine of the vehicle is turned on; and
   responsive to a determination that the engine of the vehicle is turned on, control operation of the at least one radar sensor to commence scanning of the vehicle occupant compartment at the first scanning rate.

5. The system of claim 1, wherein the third scanning rate is one scan every 30 seconds.

6. The system of claim 1, wherein the sensor control module includes computer-readable instructions that when executed by the one or more processors cause the one or more processors to, after a predetermined number of radar scans have been performed at the third scanning rate, cause generation of at least a first alert indicating that a living object resides in the occupant compartment of the vehicle.

7. The system of claim 4, wherein the sensor control module includes computer-readable instructions that when executed by the one or more processors cause the one or more processors to, responsive to a determination that the engine of the vehicle is not turned on, activate at least one weight sensor associated with at least one vehicle seat.

8. The system of claim 1, wherein the second scanning rate is less than the first scanning rate.

9. The system of claim 1, wherein the first scanning rate is a maximum scanning rate of the at least one radar sensor.

10. The system of claim 1, wherein the first scanning rate is one scan per second.

11. The system of claim 1, wherein the first plurality of predetermined events includes at least one of a vehicle door opening and closing, a switching of a vehicle ignition from an "off" state to an "on" state, and a detection of an object on at least one vehicle seat by a weight sensor configured to detect a presence of an object on the at least one vehicle seat.

12. The system of claim 1, wherein the second scanning rate is one scan every 5 minutes.

13. The system of claim 1, wherein the sensor control module further includes computer-readable instructions that when executed by the one or more processors cause the one or more processors to, responsive to the occurrence of the predetermined event of the first plurality of predetermined events, activate at least one weight sensor associated with at least one vehicle seat, and activate at least one seatbelt sensor associated with the at least one vehicle seat.

14. The system of claim 13, wherein the sensor control module includes computer-readable instructions that when executed by the one or more processors cause the one or more processors to, responsive to the occurrence of the predetermined event of the second plurality of predetermined events, deactivate the at least one weight sensor and the at least one seatbelt sensor associated with the at least one vehicle seat.

15. The system of claim 1, wherein the second plurality of predetermined events includes a vehicle ignition being switched from an "on" condition to an "off" condition, an opening of a vehicle door, a closing of a vehicle door, and a determination, based on scanning of the vehicle occupant compartment at the first scanning rate, that no living objects reside in the vehicle occupant compartment.

16. A vehicle comprising a system for controlling one or more vehicle sensors in accordance with claim 1.

17. The system of claim 1 wherein the sensor control module includes computer-readable instructions that when executed by the one or more processors cause the one or more processors to:

responsive to a determination that a living object resides in the occupant compartment of the vehicle, determine if the vehicle engine is turned on; and responsive to the vehicle engine being turned on, activate at least one weight sensor associated with at least one vehicle seat.

18. A non-transitory computer readable medium having stored therein instructions, that when executed by a computing system, cause the computing system to perform functions comprising:

if a vehicle is currently not moving, responsive to detection of a predetermined event of a first plurality of predetermined events, controlling operation of at least one radar sensor to commence scanning of an occupant compartment of the vehicle at a first scanning rate;

responsive to an occurrence of a predetermined event of a second plurality of predetermined events following commencement of scanning at the first scanning rate, controlling operation of the at least one radar sensor to commence scanning of the occupant compartment of the vehicle at a second scanning rate different from the first scanning rate;

responsive to a passage of a predetermined time period after commencement of scanning at the second scanning rate, determining if a living object resides in the occupant compartment of the vehicle;

responsive to a determination that no living object resides in the occupant compartment of the vehicle, controlling operation of the at least one radar sensor to discontinue radar scanning of the occupant compartment of the vehicle; and responsive to a determination that the engine of the vehicle is not turned on, control operation of the at least one radar sensor to commence scanning of the vehicle occupant compartment at a third scanning rate that is less than the first scanning rate and greater than the second scanning rate.

19. The non-transitory computer readable medium of claim 18 further including stored therein instructions, that when executed by a computing system, cause the computing system to perform functions comprising, if the vehicle is currently moving, and responsive to a determination that a vehicle occupant is out of position, autonomously controlling operation of the vehicle so that a maximum rate at which vehicle front wheels can be autonomously rotated is inversely proportional to a speed of the vehicle.

* * * * *